United States Patent [19]

Langen et al.

[11] 4,035,450
[45] July 12, 1977

[54] DEVICE FOR MAKING BALL-SHAPED METAL OXIDE PARTICLES AND METAL CARBIDE PARTICLES

[75] Inventors: Hans Langen, Julich; Paul Naefe, Aachen, both of Germany

[73] Assignee: Kernforschungsanlage Julich Gesellschaft mit beschrankter Haftung, Julich, Germany

[21] Appl. No.: 536,872

[22] Filed: Dec. 23, 1974

[30] Foreign Application Priority Data

Dec. 21, 1973 Germany .................... 2363827

[51] Int. Cl.² ........................................ B05B 7/06
[52] U.S. Cl. ................ 261/76; 141/285; 239/424
[58] Field of Search .................. 261/76, 78 A; 239/423–425; 141/104, 105, 285, 295

[56] References Cited

U.S. PATENT DOCUMENTS

| 1,430,303 | 9/1922 | Haitman | 261/76 |
| 1,929,348 | 10/1933 | Cathcart | 261/78 A |
| 3,122,326 | 2/1964 | Cook | 239/424 |

FOREIGN PATENT DOCUMENTS

| 1,542,158 | 5/1965 | Germany |

Primary Examiner—Tim R. Miles
Assistant Examiner—Gregory N. Clements
Attorney, Agent, or Firm—Walter Becker

[57] ABSTRACT

A device for making ball-shaped metal oxide and metal carbide particles, especially particles of fuel or breeder substances for nuclear reactors such as oxidic or carbide cores of uranium or the like. The device comprises a container for the ammonia and organic phase, and an injection tube leading into the top of the container. The injection tube is surrounded by a mantle passage of which the cross section is widened in the region of the mouth of the injection tube. The injection tube leads into the container at a distance of from 0.5 to 2 mm. ahead of the end of the mantle passage. The injection tube has an outward diameter which steadily decreases toward the mouth of the injection tube.

4 Claims, 2 Drawing Figures

DEVICE FOR MAKING BALL-SHAPED METAL OXIDE PARTICLES AND METAL CARBIDE PARTICLES

The present invention relates to a device for carrying out a method of making ball-shaped metallic carbon particles, especially of particles consisting of fuel and breeder materials for core reactors such as oxidic or carbide compounds of uranium, of plutonium and of thorium or the like with a diameter of from 0.1 to 1.5 millimeters, with which an aqueous solution of a metallic nitrate or a metallic chloride or a mixture of metallic nitrates or metallic chlorides or brine in which the metal ions have a stoichiometric relationship to the anions are introduced in the shape of droplets into an organic phase above an aqueous ammonia solution, and with which the molarity of the metal ions is between 0.4 and 1.5. In this connection, for purposes of forming carbides, carbon in a colloidal form is added to the aqueous solution and/or to the brine, and the first formed carbon containing oxide particles are sintered while as organic phase a ketone or a ketone mixture, is employed. This ketone or ketone mixture has at room temperature a dissolving ability for water of up to approximately 4% by weight and has a viscosity which lies between half and twice the viscosity of water. The device comprises a container for the ammonia solution and the organic phase thereabove and also includes an injection pipe leading into the organic phase for introducing the aqueous solution of the metallic salts in form of droplets while the injection pipe is surrounded by a mantle passage through which the organic phase enters the container and the flow cross section of which is widened within the region of the mouth of the injection pipe.

Ball-shaped metallic oxide or metal carbide particles consisting of oxidic and carbide compounds of uranium, of the plutonium or the thorium are employed in particular in core reactors as fuel and/or breeder substances. For the introduction into reactors known by the name high temperature reactors, the particles are introduced in the form of graphite covered cores (coated particles). In this connection, all ball-shaped particles embedded in the graphite matrix should have a uniform size. Therefore, it is endeavored to so design the manufacturing method for the metallic oxide or metal carbide particles that the diameter of the generated particles will already after the first method step be substantially uniform.

It has become known from German Offenlegungsschrift No. 1,542,158 to introduce into a container filled with hexanol in the form of droplets an aqueous solution of the metal nitrate or metal chloride through an injection pipe which is surrounded by a mantle passage. This method has the drawback that the droplets formed during the breaking up of the jet come into contact with the wall of the mantle passage prior to its first consolidation and are destroyed during this contact or at least deformed in an undesired manner. It is furthermore disadvantageous that for the production of particles as uniform as possible relative to the throughput of aqueous metal nitrate or metal chloride solutions, relatively great quantities of hexanol are required.

According to another heretofore known device for producing ball-shaped metal oxide or metal carbide particles, an aqueous metal nitrate or metal chloride solution is inserted in the form of droplets into a ketone or a ketone mixture which is located in a container above an aqueous ammonia solution and is enriched with ammonia. In combination with ammonia, the droplets of the metallic salt solution consolidate by forming hydroxide. For introducing the aqueous solution into the ketone or ketone mixture, an injection pipe is employed the mouth of which is surrounded by a flow of an ammonia-free ketone current which flows in a mantle passage surrounding said injection pipe. Within the region of the mouth of the injection pipe, the flow cross section of the mantle passage has a widened section so that contacts between the particles being formed and the wall of the mantle passage is avoided. The ketone flow in the mantle passage serves on one hand for preventing deposits of metal oxides or metal carbides in the mouth of the injection pipe and on the other hand serves for controlling the formation of droplets. In order to obtain this, it is necessary as already mentioned above, that the ketone passing through the mantle passage is free from ammonia. Therefore, the ketone must always be added either in fresh condition or it has to be regained by an expensive regeneraion method from the ammonia-containing ketone which flows out of the container.

It is, therefore, an object of the present invention to provide a device by means of which ball-shaped metal oxide or metal carbide particles of uniform size can be produced in such a way that relative to the quantity of produced particles only a small quantity of fresh ketone or ketone mixture will be used up.

These and other objects and advantages of the invention will appear more clearly from the following specification in connection with the accompanying drawings, in which.

Figure 1:
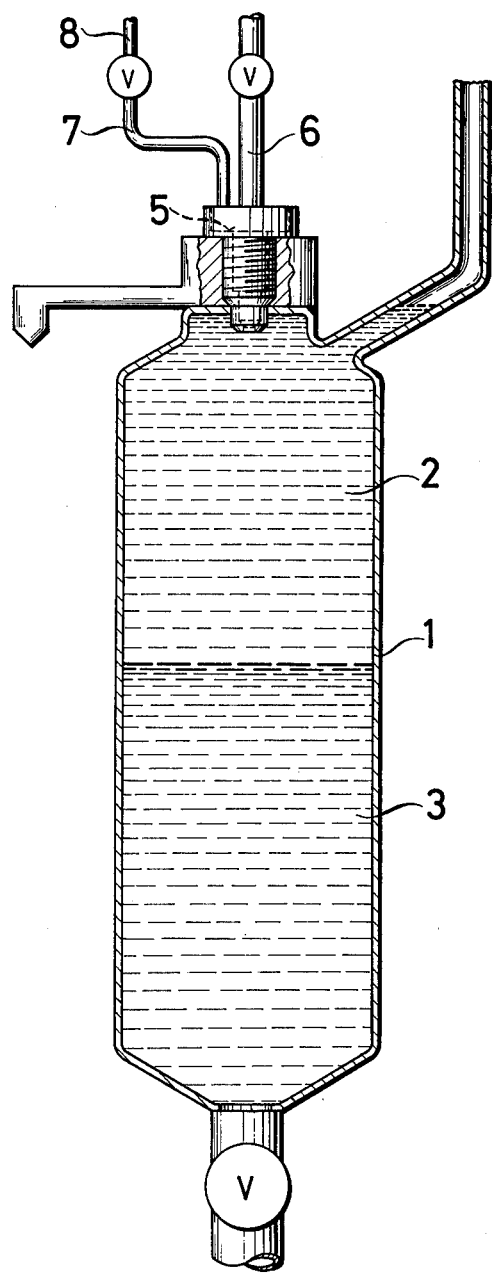
FIG. 1 illustrates a cross section of an embodiment of a device according to the invention for producing ball-shaped metal oxide or metal carbide particles.
Figure 2:
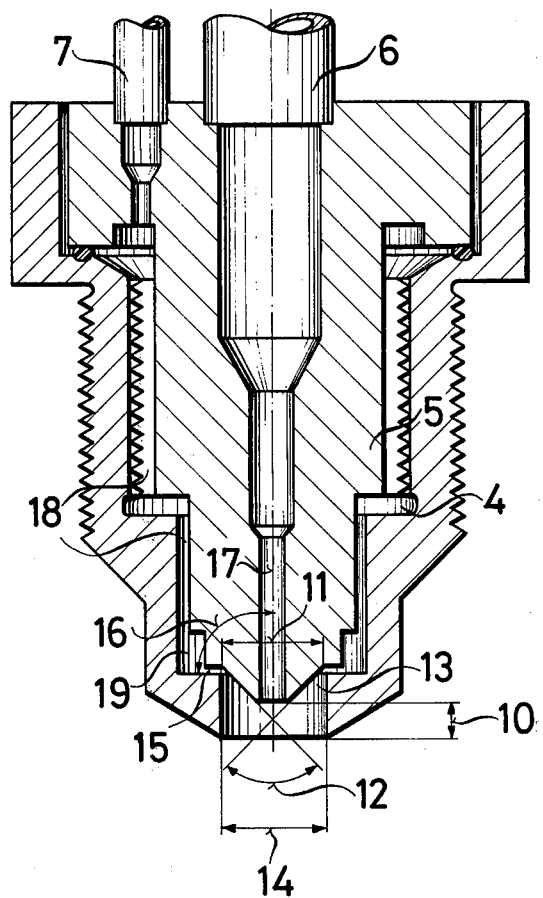
FIG. 2 illustrates the upper portion of FIG. 1 with injection pipe and mantle passage but on a larger scale than that of FIG. 1.

The device according to the present invention is characterized primarily in that the injection pipe leads into the container at a distance of from 0.5 to 2 millimeters ahead of the end of the mantle passage. The injection pipe has an outer diameter steadily decreasing toward its mouth. The mantle passage when viewed in the flow direction of the organic phase ahead of the widening of the flow cross section is so designed that the organic phase flows into the widened portion at an angle relative to the axis of the injection pipe while being distributed uniformly over the circumference of said widened portion.

For the form of the mouth of the injection pipe it has proved advantageous that with the decrease of the outer diameter at the mouth of the injection pipe a conical angle of from 60° to ° is formed. Preferably, the mantle passage is so designed that the organic phase flows into the widened portion at an angle of 90° with regard to the axis of the injection pipe. The form of the mouth of the injection pipe and the guiding of the ketone flow in the mantle passage permit a considerable reduction in the quantity of ketone which passes in the form of an ammonia-free ketone flow through the mantle passage. The production of ball-shaped metal oxide and metal carbide particles can thus be carried out in a considerably more economical manner than heretofore. A destruction or deformation of already formed droplets is avoided by the extremely narrow distance of the mouth of the injection pipe from the end of the mantle passage. The said distance is so determined that the formation of droplets after the discharge of the aqueous solution from the injection pipe will be initiated still within the widened portion of the mantle passage. Within the ammonia-containing ketone or ketone mixture in the container, the droplets will then slowly drop so that they can consolidate to a ball-shaped form in an undisturbed manner. The consolidation of the droplets within the ketone layer is sufficient in order to obtain the ball shape of the particles during the passage through the border surface between the ketone and the aqueous ammonia solution. The particle size being formed of the metal oxide or metal carbide particles differ only so sightly from each other that also high requirements as to these differences from the rated value can be made.

In order to avoid difficulties when starting the operation of the device according to the present ivention, it is suggested, according to a further development of the invention, that the widened portion at the end of the mantle passage has a diameter which is greater than the diameter of droplets of the solution which leave the injection pipe due to a static dripping. The diameter of the widened portion can be calculated in a well-known manner in conformity with the inner diameter of the injection pipe.

Referring now to the drawings in detail, the device illustrated therein comprises a container 1 for a ketone or ketone mixture 2 which is located in the container 1 above an aqueous ammonia solution 3. In the container 1 vertically from above there is introduced an injection pipe 5 which is surrounded by a mantle passage 4. At the end where the injection pipe 5 projects from the container 1, the injection pipe 5 is provided with a connection 6 for an aqueous solution of a metal nitrate or a metal chloride or a mixture of metal nitrates or metal chlorides. As aqueous solution there may also be employed a brine in which the metal ions have a stoichiometric relationship to the anions. The mantle passage 4 is in communication with a feeding line 7 which supplies the mantle passage 4 with ammonia-free ketone or a ketone mixture 8. The ketone flow as well as the flow of the aqueous solution in the injection pipe 5 is adapted to be controlled by a pressure controlling device which is not shown in the drawing. The flow condition of the aqueous solution during the entry into the ketone flow lies between the static dripping and the dynamic wave formation (Zerwellen).

The injection pipe 5 is axially arranged in the mantle passage 4. The mouth 9 of the injection pipe 5 is located at a distance 10 from the end of the mantle passage 4 in the container 1, said distance amounting to from 0.5 to 2 millimeters. The mouth 9 of the injection pipe 5 is in this specific example cone-shaped so that the injection pipe has an outer diameter which decreases in a continuous manner toward the mouth 9. The conical angle 12 formed at the mouth 9 amounts to about 90°.

Within the region of the mouth 9 of the injection pipe 5, the mantle passage 4 has widened portion 13 of its flow cross section. The diameter 14 of said widened portion 13 is so dimensioned that a droplet which leaves the injection pipe 5 while the aqueous solution drops statically cannot contact the wall of the mantle passage 4. Directly ahead of the widened portion 13, the mantle passage 4 advantageously has a circular disc-shaped flow cross section 15 through which the ammonia-free ketone or ketone mixture 8 which flows in the mantle passage flows into the widened portion 13 at a 90° angle 16 with regard to the axis 17 of the injection pipe 5. The ketone or ketone mixture 8 is introduced from the feeding line 7 through recesses 18 between the mantle passage 4 and injection pipe 5 into an annular portion 19 of the mantle passage 4. At the lower end of the annular part 19 the ketone or ketone mixture passes through the circular flow cross section 15 radially inwardly and uniformly distributed over the circumference of the widened portion 12 into the widened portion 13. This guiding of the ketone flow in the mantle passage 4 in connection with the form of the mouth of the injection pipe 5 and the distance of the mouth from the end of the mantle passage 4 in container 1 makes possible with regard to the quantity of themetal salt solution to be processed a considerable reduction in the quantity of ketone which passes through the mantle passage. With only extremely slight differences between the diameters of the produced metal carbide or metal chloride particles, it was possible between the required quantity of ketone and the processed quantity of aqueous solution of metal nitrate or metal chloride to obtain the extremely satisfactory ratio of less than 1:10.

It is, of course, to be understood that the present invention is, by no means, limited to the specific showing in the drawings but also comprises any modification within the scope of the appended claims.

What we claim is:

1. A device for use in connection with the preparation of ball-shaped particles of metal oxides, and of metal carbides, especially of particles of fuel and breeder substances for core reactors, which includes in combination: a container for receiving an aqueous ammonia solution and an organic phase thereabove, an injection tube leading from the outside of said container into the upper portion of said container for introducing thereinto an aqueous solution of metal salts in the organic phase in the form of droplets, having an undisturbed flow therewith, a mantle passage associated with said injection tube and surrounding same for introducing said organic phase into said container, the cross section of said mantle passage increasing within the range of the mouth of said injection tube, and said injection tube leading into said container at a distance of from 0.5 to 2mm ahead of the end of said mantle passage when viewed from the interior of said container and the outer diameter of said injection tube having an outer diameter steadily decreasing toward the mouth of said injection tube, the cross sectional increase of said mantle passage being so designed that the organic phase with droplets flows into said cross sectional increase of said mantle at an angle with regard to the axis of said injection tube while being uniformly distributed over the circumference.

2. A device in combination according to claim 1, in which the outer diameter at the mouth of said injection tube decreases so as to form a cone angle of from 60° to 90°.

3. A device in combination according to claim 1, in which the mantle passage in the flow direction of the organic phase is so designed that the organic phase flows into the cross sectional increase of said mantle at an angle of approximately 90° to the axis of said injection tube.

4. A device in combination according to claim 1, in which the increase at the end portion of said mantle passage has a diameter which is greater than the diameter of droplets of the solution leaving the injection tube while dripping statically.

* * * * *